United States Patent Office 3,163,444
Patented Dec. 29, 1964

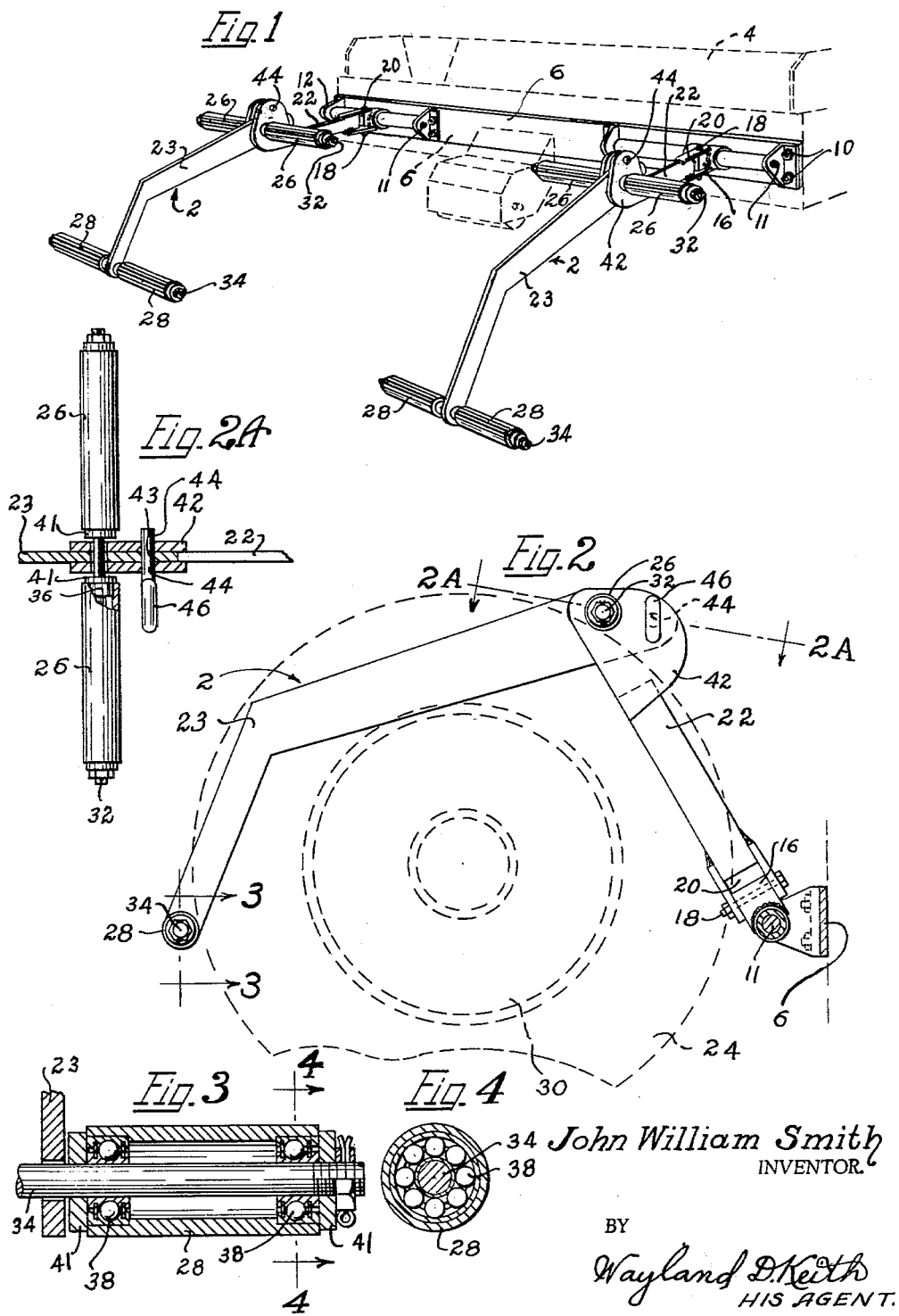

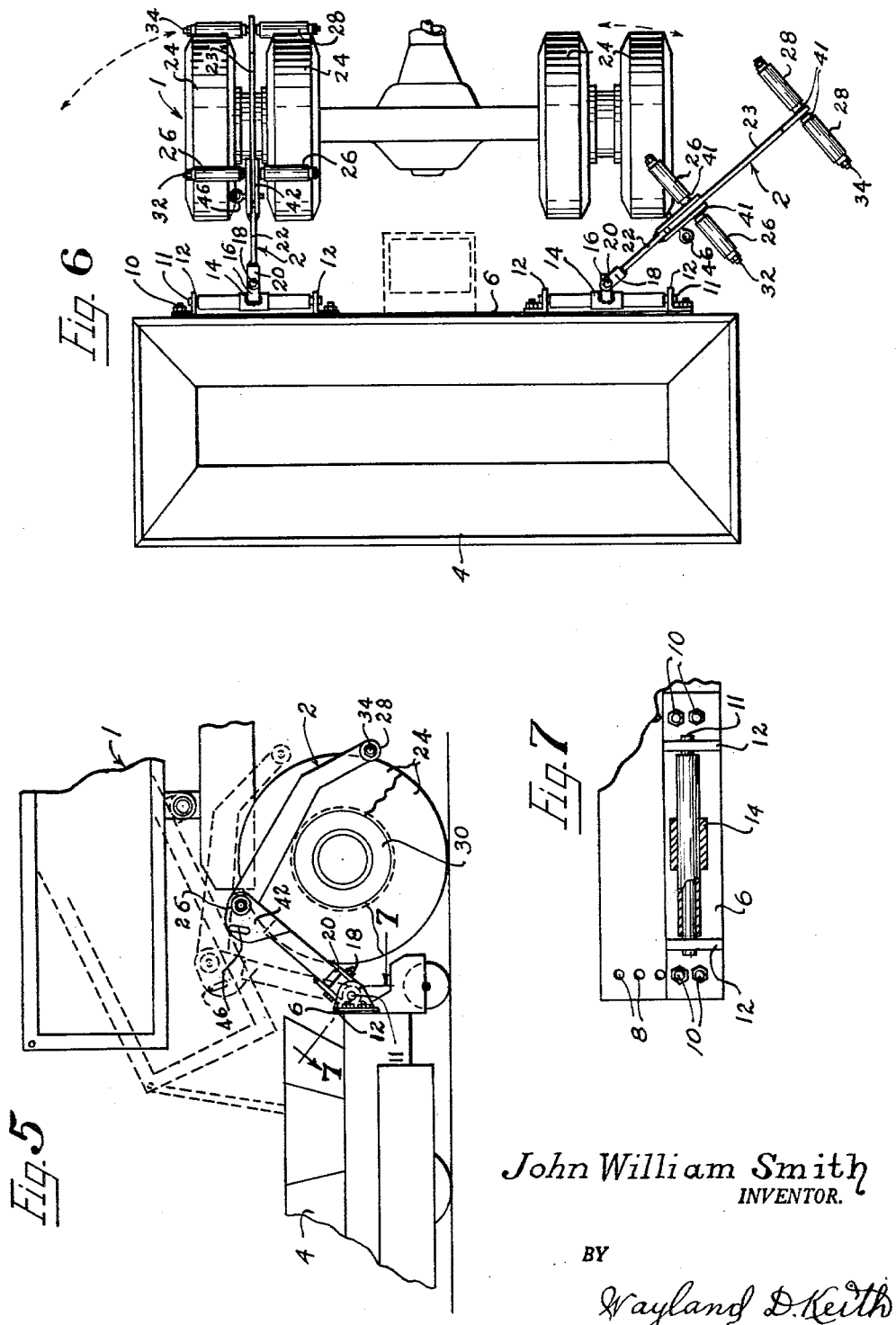

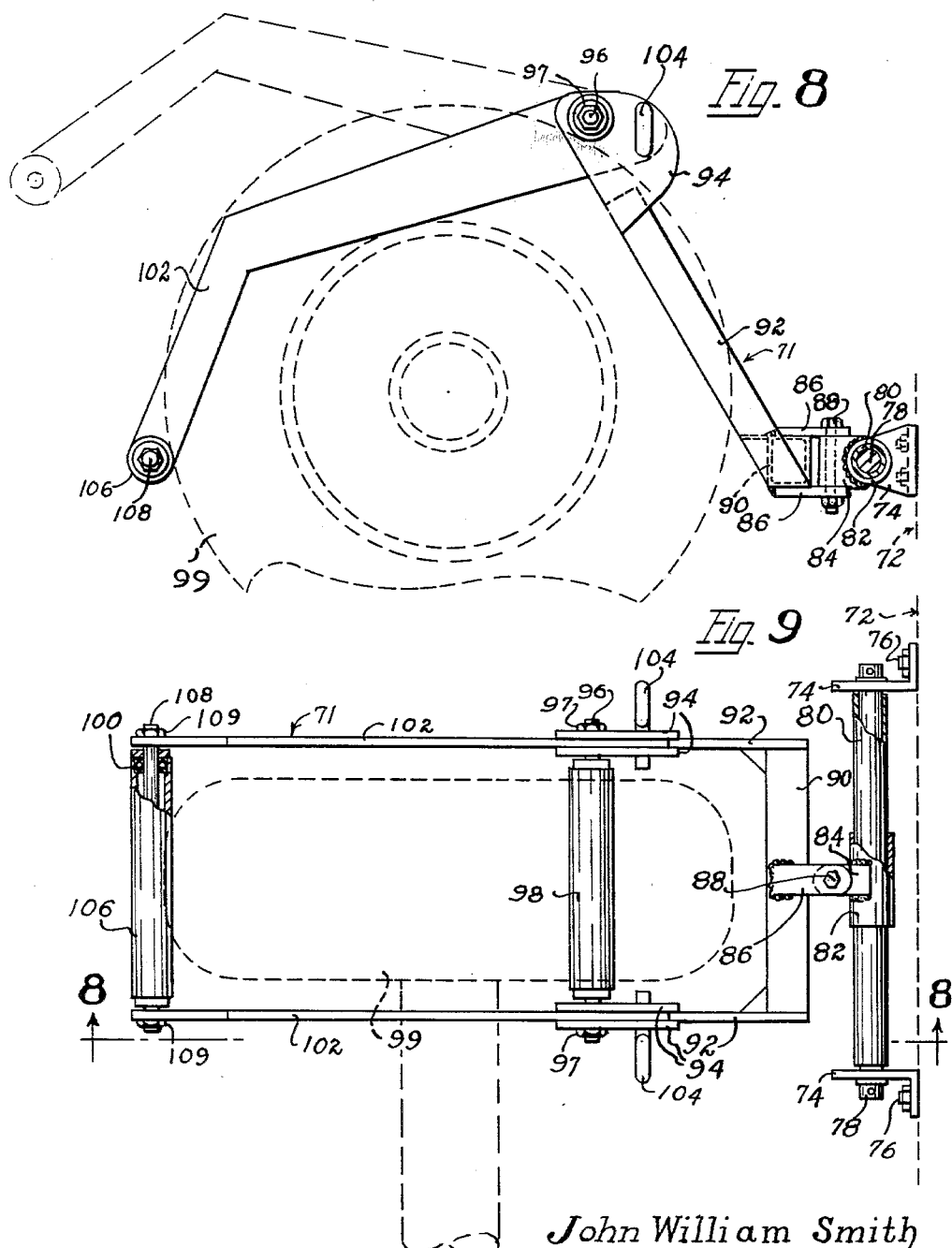

3,163,444
DRAWBARS
John William Smith, 617 NW. 18th St.,
Oklahoma City, Okla.
Filed May 27, 1963, Ser. No. 283,200
8 Claims. (Cl. 280—492)

This invention relates to improvements in drawbars and more particularly to drawbars used to quickly connect trucks or trailers to a trailing element and to quickly detach the trailing element therefrom.

Various drawbars have been proposed heretofore to connect trailing elements or vehicles to a truck, however, these have usually required from a minute to several minutes to connect or disconnect positive connections, whereas the present device may be readily connected to a truck or trailer having pneumatic tires or it may be disconnected therefrom in a matter of seconds, to enable the truck or trailer to tow a vehicle or the like therebehind without having to utilize any special hitch on the truck or trailer to positively connect the drawbar thereto.

An object of this invention is to provide a quickly attachable and detachable drawbar for attachment to a truck or trailer which utilizes pneumatic tires on the rear thereof.

Another object of the invention is to provide a drawbar for attachment to a truck or trailer using dual tires on the rear thereof, which drawbar does not require ancillary attachments on the truck or trailer to attach the drawbar thereto.

Another object of the invention is to provide a quickly attachable and detachable drawbar for a truck or trailer having dual tires on the rear thereof whereby, when attached to the truck in towing relation, the line of pull will be such as to cause the drawbar to engage the respective pairs of wheels tightly in pulling relation.

Still another object of the invention is to provide a drawbar attachment for trucks or trailers having dual wheels on the rear thereof, which drawbar attachment may be readily attached to any truck using dual wheels without special fixtures being required.

A further object of the invention is to provide a trailer hitch which may be utilized to connect any trailed vehicle to any vehicle using dual tires, whether a pony axle, ten wheeler or dump trailer or the like.

Still a further object of the invention is to provide a trailer connection for a vehicle to enable a trailed machine, such as an asphalt spreader, to be connected in close relation with the dump truck or dump trailer in such manner that the dump truck or trailer may readily dump asphalt aggregate into the hopper of the asphalt spreader and compacter while towing the spreader and compacter over the terrain.

A final object of the invention is to provide a quickly attachable and detachable drawbar for attachment to a vehicle having one or more tired wheels on each side of the rear thereof.

With these objects in view and others which will become manifest as the description proceeds, reference is to be had to the accompanying drawings in which like reference characters designate like parts in the several views thereof, in which:

FIG. 1 is a prespective view of a trailed vehicle having drawbars attached to the forward end thereof for attachment to a vehicle using dual tires and showing the drawbars in disconnected relation with respect to the towing vehicle;

FIG. 2 is an enlarged side elevational view of the drawbar arranged in towing relation with respect to a dual tire and showing the peripheral outline of the tire and wheel in dashed outline; with parts shown in section;

FIG. 2A is a sectional view taken on line 2A—2A of FIG. 2, looking in the direction indicated by the arrows;

FIG. 3 is an enlarged fragmentary, sectional view taken on line 3—3 of FIG. 2, looking in the direction indicated by the arrows;

FIG. 4 is a sectional view taken on line 4—4 of FIG. 3, looking in the direction indicated by the arrows;

FIG. 5 is a fragmentary side elevational view of the rear portion of a dump truck having dual wheels thereon, with the dump truck body being shown in full outline in transport position and in dashed outline in dumping position, and showing a vehicle being trailed behind the truck in close coupled relation, and showing the material from the dump body being dumped thereinto with the towing position of the drawbar shown in full outline and the detaching position of the drawbar shown in dashed outline;

FIG. 6 is a top plan view of the rear portion of a truck with the body thereof being removed and showing a towed vehicle being connected thereto with the drawbar, with one side thereof being shown in connected towing relation and the other side thereof showing the drawbar being swung outward from over the dual wheels;

FIG. 7 is a fragmentary, sectional view taken on line 7—7 of FIG. 5, looking in the direction indicated by the arrows, with parts broken away;

FIG. 8. is a fragmentary side elevational view of a pneumatically tired wheel, shown in dashed outline, on which is shown a modified form of drawbar, which drawbar is connected thereto and is shown in full outline, and showing a portion of the modified form of drawbar in disconnected position in dashed outline, with a portion of the drawbar being shown in section taken on the line 8—8 of FIG. 9; and FIG. 9 is a top plan view of the modified form of the invention, showing one drawbar of a pair of drawbars in full outline, with parts being broken away and shown in section and showing a single wheel and a portion of an axle in dashed outline.

With more detailed reference to the drawing for purposes of illustration of the invention, the numeral 1 designates generally a truck having dual wheels. The present drawbar, designated generally by the numeral 2, is adapted to connect to any type of vehicle to be towed, such as indicated at 4. The drawbar, as shown in FIGS. 1, 2, 5, and 6, is attached to the vehicle to be towed by bars 6. The bar 6 may be bolted or welded to the vehicle, but it is preferable to bolt the bar 6 onto the vehicle 4. A series of holes 8 may be arranged vertically on the vehicle 4 to enable bolts 10 to pass through holes 8 and through the bar 6, as will best be seen in FIG. 7. This enables the bar 6 to be adjusted with respect to the height of the truck 1.

A shaft 11 is mounted on and journaled within each adjacent pair of lugs 12 on the forward side of the respective bars 6, each which shaft is of sufficient size to sustain the pull of the vehicle being towed. Each shaft 11 preferably has a smooth surface and has a sleeve 14 thereon, which sleeves will pivot about the respective shafts 11 and will slide longitudinally thereon. Each sleeve 14 has an apertured lug 16 secured to and extending outwardly therefrom, which aperture is at a right angle to the axis of shaft 11. Each drawbar 2 consists of two links on bars designated 22 and 23. The bars 22 and 23 are hinged to each other, as described hereinafter. The bar 22 is connected to the lugs 16. To accomplish this, one end, designated 20, of bar 22 is forked and apertured so that it receives the respective lugs 16 so the apertures in the respective lugs 16 register with the respective apertures in the forked end 20 to receive a pivot pin 18 therethrough to pivot about an upright axis. Thus the device pivotally attaching the drawbar 2 to the vehicle 4 may be said to include a universal joint which permits the drawbar to swing both vertically and horizontally with respect to the vehicle 4.

Since there is a slight variation between the spacing of the pairs of dual wheels on trucks, the sleeve 14 is free to slide longitudinally of shaft 11 so that the drawbar automatically center between each pair of dual wheels on the rear of the truck 1. In this manner three separate and independent alignments may be had, that is, the drawbar 2 automatically align mediate each pair of dual wheels by the sleeve 14 sliding on shaft 11. Each drawbar is free to swing about the pins 18 and furthermore each drawbar is free to pivot about the axis of the respective shafts 11. This arrangement enables the drawbar to be quickly installed by merely swinging the drawbar over the wheel and dropping the bar 23 between the tires 24 until the rollers 26 thereof rest or ride upon the respective tires, as indicated in full outline in FIG. 1. Thus the rollers 26 constitute means secured to the drawbars 2 for supporting the rollers 28. With the rollers 26 thus positioned, the rollers 28 on the forward or distal end of the bar 23 are in contact with the forward side of the respective tires of the dual wheels 30 of the truck 1. The arrangement is such that an imaginary line taken from the pivot point of shaft 11 to the axis of shaft 34 on which rollers 28 are mounted is below the axis of wheel 30. This imaginary line is the line of pull from the truck 1 to the vehicle 4. With pull being applied by the wheels 30, the rollers 28 roll in journaled relation on anti-friction bearings 38, one of which anti-friction bearings is mounted in each end of each roller 28, and as the wheel turns and the vehicle moves forward, the rollers 28 turn in rolling relation on shaft 34. The rollers 26 are journaled on shaft 32, and each roller 26 has an anti-friction bearing 36 journaled in each end thereof in the same manner as rollers 28. In this manner the rollers 28 are supported in exact relation to the tires 24 at all times.

The rollers 26 and 28 are mounted on the respective shafts 32 and 34 so that each shaft is loosely journaled within the respective drawbars 2, as will be more fully brought out hereinafter. The ball bearings 36 and 38 in each end of each roller are preferably of the sealed lubricant type with a thrust member 41 at each end of each roller with a certain degree of looseness between the inner thrust member and the drawbar 2 so as to permit a limited longitudinal movement, as well as an up and down angular movement to enable the rollers to seek an even pull on the tread of the tire, even though the adjacent tire treads of the respective pairs of duals are of unequal size. This permits the shifting of the shafts 32 and 34 to enable proper alignment with the face of the tire and give uniform pull on the respective drawbars.

The shafts 32 and 34 are of smaller diameter than the respective holes in the bars 22 and 23 in which the shafts are fitted. There is also lateral clearance between the thrust members 41 and the bars 22 and 23 so as to enable the rollers 26 and 28 to readily align with the treads of the respective tires on which they engage.

In moving the drawbars 2 into position between the respective pairs of dual wheels 24 to enable the towing of a vehicle therebehind, or the towing of any object, it is normally necessary to swing the drawbar to a point above wheels 24, as indicated in dashed outline in FIG. 5, until the drawbar 2 is directly between the tires 24, whereupon the drawbar 2 is lowered until the rollers 26 engage the upper surfaces of tires 24 which positions rollers 28 in the correct position for the towing of the vehicle 4.

As mentioned above, bars 22 and 23 are hinged to each other. This may be accomplished by welding a pair of lugs 42 to bar 22. The lugs 42 receive the end of bar 23. The shaft 32 passes through a hole in the bar 23 and holes in the lugs 42 and thus forms a hinge.

In addition, means is provided for releasably locking the bars 22 and 23 in a definite angular position with respect to each other. To accomplish this, each lug 42 has axially aligned holes 44 therethrough, through which a pin 46 is fitted. The bar 23 has a hole 43 therethrough so that the pin 46 may extend through hole 43 when the hole 43 is in axial alignment with holes 44. With the pin 46 inserted through holes 43 and 44, as shown in FIG. 2, the bars 22 and 23 held in the position as shown in FIG. 2 so long as the vehicle 4 is being towed. However, if the bed of the truck 1 is so close to the top of tires 24 that the drawbar 2 cannot be raised to the dashed outline position as indicated in FIG. 5, the pins 46 may be removed from holes 43 and 44, which allows the bars 22 and 23 to pivot about shaft 32 and attain a position as shown in FIG. 1. This enables the truck to be moved forward with the roller 28 moving upward along the peripheral surface of tire 24 and over the top of these tires.

To enable the coupling of a truck to the vehicle being towed, the reverse procedure is followed in that the rollers 24 are raised upward and with the bars 22 and 23 in the extended position as shown in FIG. 1, the rollers pass over the top of the tires and fall down into a position shown in full outline in FIG. 5, whereupon pins 46 may be inserted through holes 43 and 44.

The present device is particularly adaptable to the towing of asphalt spreading and compacting devices, which enables the asphalt spreading and compacting device to be towed in short coupled relation with respect to the truck or trailer having asphalt material therein that is to be dumped into the hopper of the device being towed. While an illustration of using the present device in conjunction with an asphalt aggregate spreader and compacter has been used as an example of short coupled towing, it is to be understood that this tow bar may be utilized for any type of tow bar work that is desirable.

Modified Form of Invention

With more detailed reference to the modified form of the invention, the drawbar, as shown in FIGS. 8 and 9, is designed to operate on a single wheel, such as single wheel tires on trucks and trailers.

The principles of operation of the species of the invention shown in FIGS. 8 and 9 is the same as that described above. The structure differs in that the forward end of the drawbar is composed of a rectangular frame which can be fitted over the rear wheel of a truck. A roller is mounted on the forward end of the frame between the two sides thereof.

The preferred arrangement of the modified form of the invention utilizes a drawbar designated generally by the numeral 71, which is attached to the trailing vehicle 72, such as the vehicle shown in FIGS. 1, 5 and 6, by apertured lugs 74, which lugs are attached to the vehicle by bolts 76, so that the apertures in the outstanding portion of the respective lugs receive a shaft 78 therethrough, on which shaft a sleeve 80 is pivotally mounted. A further sleeve 82 is pivotally and slidably mounted on sleeve 80 so as to enable the centering of the respective drawbars 71 centrally behind the truck or trailer tire, thereby enabling the difference in gauge width of wheels to be readily compensated for without mechanical alignment or adjustment being necessary.

The sleeve 82 has an outwardly extending vertically apertured lug 84 secured to the forward side thereof, as by welding or the like, which lug is adapted to be connected to a clevis 86. A bolt 88 passes through the apertures in the clevis 86 and in lug 84 to form a pivot joint to enable the drawbar 71 to swing about a vertical axis. The clevis 86 is attached to a cross bar 90, which in turn, has flat side members 92 secured thereto, as by welding, which side members extend upward and forward. A pair of plates 94 is secured to the upper end of each side member 92. Both pairs of plates 94 for each wheel 99 are transversely apertured so that the apertures are in aligned relation to receive an axle shaft 96 therethrough, on which axle shaft a roller 98 is journaled on bearings 100. Apertured side bars 102 are pivotally mounted on axle shaft 96, and a portion of each bar 102 extends rearwardly from axle shaft 96 and is aperture to complementally register with apertures in plates 94 to enable pins 104 to be passed therethrough, when forwardly extending side bars 102 are in one position, to lock hold the bars 102 in an angulated position. The bars 102 are provided with a roller 106 which is positioned on axle shaft 108 which passes through aligned apertures in the forward ends of bar members 102. Thus the two side bars 102 and the shafts 96 and 108 form a rectangular frame adapted to fit over a wheel 99 of the truck.

When in locked angulated position, as shown in full outline in FIGS. 8 and 9, and with the pins 104 in place, the center of the line of pull between shaft 78 and axle shaft 108 is below the axis of wheel 99. Therefore, when pull is exerted on drawbar 71, the roller 106 will roll, as will roller 98, to permit towing action to vehicle 72.

When it is desired to disconnect the drawbar 71 from wheel 99, the pins 104 may be removed, which permits extension of the drawbar 71, whereby the roller 106 may roll out over the top of the wheel 99 and drop to the ground. The construction of roller 106 is similar to that of the aforementioned roller 28 described above, that is, a bearing is provided at each end thereof to permit free turning movement thereof relative to the axle on which the bearings are mounted. The axles 96 and 108 are screw threaded on the respective outer ends thereof to receive the respective nuts 97 and 109 thereon.

Having thus clearly shown and described the invention, what is claimed as new and desired to be secured by Letters Patent is:

1. In an arrangement for towing a vehicle by a truck or the like having pneumatically tired wheels, the combination including a drawbar, a device pivotally attaching said drawbar to the vehicle to be towed, a roller mounted on the distal end of said drawbar adapted to engage the forward side of a wheel on the truck, and means secured to said drawbar and adapted to ride upon the wheel engaged by said roller for supporting said roller in such position that an imaginary line of pull taken from said device to the axis of said roller is below the axis of rotation of said wheel.

2. The arrangement defined in claim 1 in which said drawbar extends upwardly from said device for a predetermined distance and then downwardly toward its distal end.

3. The arrangement defined in claim 1 wherein said means for supporting said roller includes a second roller.

4. The arrangement defined in claim 1 wherein said device for pivotally attaching said drawbar to said vehicle includes a universal joint permitting said drawbar to swing laterally as well as vertically with respect to the vehicle.

5. The arrangement defined in claim 1 in combination with a sleeve and shaft for mounting said device, said sleeve being slidable on said shaft whereby said drawbar may automatically center itself according to the line of pull.

6. The arrangement defined in claim 1 in which said drawbar consists of two bars hinged to each other and in which means is provided for releasably locking the two bars in a definite angular position with respect to each other.

7. The arrangement defined in claim 1 adapted for use with a truck having dual rear wheels and in which two rollers are mounted on the distal end of said drawbar, whereby the drawbar may be placed between the dual wheels on one side of the truck and the two rollers engage the forward side of the dual wheels on that side of the truck.

8. The arrangement defined in claim 1 in which the drawbar has a forward end composed of a rectangular frame adapted to fit over the wheel of a truck, and in which said roller is mounted on the forward end of the frame between the two sides thereof.

References Cited by the Examiner
UNITED STATES PATENTS

| 2,104,362 | 1/38 | Cummings | 214—1 |
|---|---|---|---|
| 3,095,788 | 7/63 | Odell | 94—44 |

References Cited by the Applicant
UNITED STATES PATENTS

| 1,672,598 | 6/28 | Blackett. |
| 2,117,562 | 5/38 | Marsch. |
| 2,730,378 | 1/56 | Fergason. |
| 2,954,241 | 9/60 | Warren. |

A. HARRY LEVY, *Primary Examiner.*